(12) United States Patent
Chan (10) Patent No.: US 10,151,913 B2
(45) Date of Patent: Dec. 11, 2018

(54) ENDOSCOPE WITH DISTANCE MEASUREMENT FUNCTION AND DISTANCE MEASUREMENT METHOD USED IN SAME

(71) Applicant: MEDICAL INTUBATION TECHNOLOGY CORPORATION, Taoyuan (TW)

(72) Inventor: Chih-Chun Chan, Taoyuan (TW)

(73) Assignee: MEDICAL INTUBATION TECHNOLOGY CORPORATION, Taoyuan (TW)

( * ) Notice: Subject to any disclaimer, the term of this patent is extended or adjusted under 35 U.S.C. 154(b) by 49 days.

(21) Appl. No.: 15/612,161

(22) Filed: Jun. 2, 2017

(65) Prior Publication Data
US 2018/0003943 A1    Jan. 4, 2018

(30) Foreign Application Priority Data

Jun. 29, 2016 (TW) .............................. 105120513 A (51) Int. Cl.
| | | |
|---|---|---|
| *G02B 23/24* | (2006.01) | |
| *G01B 11/03* | (2006.01) | |
| *H04N 5/225* | (2006.01) | |
| *G06T 7/521* | (2017.01) | |

(Continued)

(52) U.S. Cl.
CPC ........ *G02B 23/2423* (2013.01); *G01B 11/022* (2013.01); *G01B 11/03* (2013.01); *G02B 23/2461* (2013.01); *G02B 23/2484* (2013.01); *G02B 27/425* (2013.01); *G06T 7/521* (2017.01); *H04N 5/2253* (2013.01); *H04N 5/2254* (2013.01); *H04N 5/2256* (2013.01); *G06T 2207/10068* (2013.01); *H04N 2005/2255* (2013.01)

(58) Field of Classification Search
CPC ............ G02B 23/2423; G02B 23/2461; G02B 23/2484; G02B 27/425; G06T 7/521; G01B 11/022; G01B 11/03; H04N 5/2253; H04N 5/2254; H04N 5/2256
USPC .......................................................... 348/68
See application file for complete search history.

(56) References Cited

U.S. PATENT DOCUMENTS 8,878,920 B2 * 11/2014 Ovod ...................... A61B 1/06
    348/68
2010/0324366 A1   12/2010 Shimotsu

FOREIGN PATENT DOCUMENTS

WO    WO2015/098353 A1    7/2015

* cited by examiner

*Primary Examiner* — Hee-Yong Kim
(74) *Attorney, Agent, or Firm* — Muncy, Geissler, Olds & Lowe, P.C.

(57) ABSTRACT

An endoscopic distance measurement method, which causes a single wavelength light source in an observation unit at a front end of a flexible tube of an endoscope to emit a predetermined wavelength light to an object to be measured via a diffraction grating so as to form a zero-order bright spot, a positive first-order bright spot and a negative first-order bright spot on the surface of the object through optical diffraction, and then capture an image from the object, and then calculate a distance magnification using a first arithmetic logic, and then to calculate the actual distance between two adjacent bright spots of the predetermined wavelength light being projected on the object using a second arithmetic logic and then to calculate the distance between the diffraction grating and the zero-order bright spot using a third arithmetic logic.

15 Claims, 9 Drawing Sheets (51) Int. Cl.
*G02B 27/42* (2006.01)
*G01B 11/02* (2006.01)

ENDOSCOPE WITH DISTANCE MEASUREMENT FUNCTION AND DISTANCE MEASUREMENT METHOD USED IN SAME

BACKGROUND OF THE INVENTION

1. Field of the Invention

The present invention relates to endoscopy technology and more particularly, to an endoscope with distance measurement function, which employs optical interference technology for distance measurement. The invention relates also to a distance measurement method used in the endoscope.

2. Description of the Related Art

Many methods for use in an endoscope for distance measurement are known. WO 2015/098353 A1 discloses method of measuring distance by an endoscope. This method utilizes a movable joint and a visual axis to achieve distance measurement. Although this method can achieve distance measurement, it needs to use a physical movable joint. As this physical movable joint is movable, its control in measurement is complicated.

US 2010/0324366 A1 discloses another endoscopic distance measurement method, which uses a measurement light for projecting onto the surface of an object, an image sensor for capturing a projected shape of the measurement light, and an image processing circuit for extracting the projected shape from an image obtained from the image sensor, and calculates the size of the extracted projected shape to calculate the distance and angle between the endoscope and the object.

SUMMARY OF THE INVENTION

The present invention has been accomplished under the circumstances in view. It is the main object of the present invention to provide an endoscope with a distance measurement function, which employs optical interference/diffraction technology for distance measurement.

To achieve this and other objects of the present invention, an endoscope comprises a main unit, an observation unit, and a flexible tube coupled between the main unit and the observation unit. The observation unit comprises a base tube, a single wavelength light source, a diffraction grating, an image acquisition unit and a shading baffle. The ingle wavelength light source, the diffraction grating, the image acquisition unit and the shading baffle are respectively mounted within the base tube. The base tube defines an opening in a front side thereof. The single wavelength light source is mounted in the base tube, and adapted for emitting a single wavelength light of a predetermined wavelength forwardly through the opening. The diffraction grating comprises a plurality of slots. Further, the diffraction grating is mounted in the base tube between the single wavelength light source and the opening, and adapted for diffracting the single wavelength light and causing the diffracted single wavelength light to be projected through the opening onto an object to show a zero order bright spot, a positive first-order bright spot at one lateral side relative to the zero-order bright spot and a negative first-order bright spot at an opposite lateral side relative to the zero-order bright spot. The vector angle between the zero-order bright spot and each of the positive first-order bright spot and the negative first-order bright spot of the single wavelength light emitted by the single wavelength light source is obtained by calculating the predetermined wavelength and the slot width of the diffraction grating. The image acquisition unit is mounted in the base tube, comprising an image sensor and a lens set. The lens set comprises a lens magnification. The image acquisition unit is adapted for taking an image of the object via the opening. The effective imaging range of the image acquisition unit covers the zero-order bright spot, the positive first-order bright spot and the negative first-order bright spot. The shading baffle is mounted in the base tube to isolate the image acquisition unit from the single wavelength light source and the diffraction grating so as to prohibit the single wavelength light emitted by the single wavelength light source from being reflected or refracted in the base tube onto the image acquisition unit. The main unit comprises a computing unit. The computing unit has built therein a reference number of standard bright spot pixels. Further, the computing unit comprises a first arithmetic logic, a second arithmetic logic and a third arithmetic logic. The first arithmetic logic is adapted for obtaining a distance magnification by calculating the lens magnification and the pixel number of any one bright spot on the image and the reference number of pixels of standard bright spot. The second arithmetic logic is adapted for calculating the distance between two adjacent bright spots on the image using the distance magnification so as to obtain the actual distance between two adjacent bright spots projected on the object. The third arithmetic logic is adapted for calculating the distance between the diffraction grating and the zero-order bright spot by matching the vector angle with the actual distance between the two adjacent bright spots.

Thus, the endoscope of the present invention is based on the optical interference/diffraction technology, and the distance of the object is measured by judging the diffraction bright spot. This technique is different from the prior art.

It is another object of the present invention to provide an endoscopic distance measurement method, which employs optical interference/diffraction technology for distance measurement.

To achieve this and other objects of the present invention, an endoscopic distance measurement method comprises the steps of: A) causing a single wavelength light source in an observation unit at a front end of a flexible tube of an endoscope to emit a single wavelength light of a predetermined wavelength onto an object via a diffraction grating to form on a surface of the object a zero-order bright spot, a positive first-order bright spot at one side relative to the zero-order bright spot and a negative first-order bright spot at an opposite side relative to the zero-order bright spot, wherein the vector angle between the zero-order bright spot and each of the positive first-order bright spot and negative first-order bright spot of the single wavelength light emitted by the single wavelength light source is obtained by calculating the predetermined wavelength and the slot width of slots in the diffraction grating; B) causing an image acquisition unit of the endoscope to take the image of the object that contains the zero-order bright spot, the positive first-order bright spot and the negative first-order bright spot; and C) causing a computing unit in a main unit of the endoscope to calculate the number of pixels of the zero-order bright spot, the positive first-order bright spot and the negative first-order bright spot on the image, and then to refer the calculation results to a reference number of pixels of standard bright spot preset in the computing unit, and then to calculate a distance magnification according to the lens magnification of a first arithmetic logic and the image acquisition unit, and then to calculate the distance magnification and the distance between two adjacent bright spots on the image using a second arithmetic logic so as to obtain the actual distance between two adjacent bright spots on the object, and finally to calculate the actual distance between the two adjacent bright spots and the vector angle using a third arithmetic logic so as to further obtain the distance between the diffraction grating and the zero-order bright spot.

Thus, the endoscopic distance measurement method of the present invention is based on the optical interfer4ence/diffraction technology, and the distance of the object is measured by judging the diffraction bright spot. This technique is different from the prior art.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-6, the invention provides an endoscope with distance measurement function. The endoscope 10 in accordance with a first embodiment of the present invention generally comprises a main unit 11, a flexible tube 21 and an observation unit 31.

Figure 1:
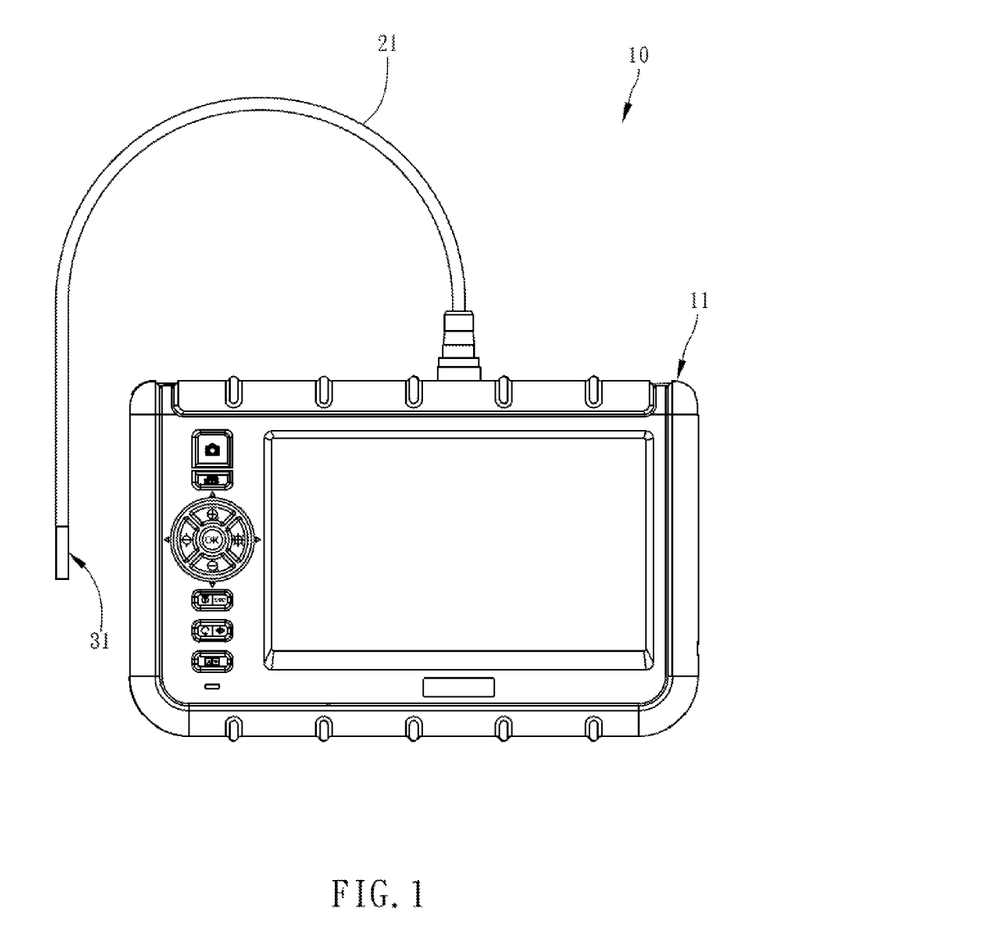
FIG. 1 is a schematic structural view of an endoscope in accordance with a first embodiment of the present invention.
Figure 2:
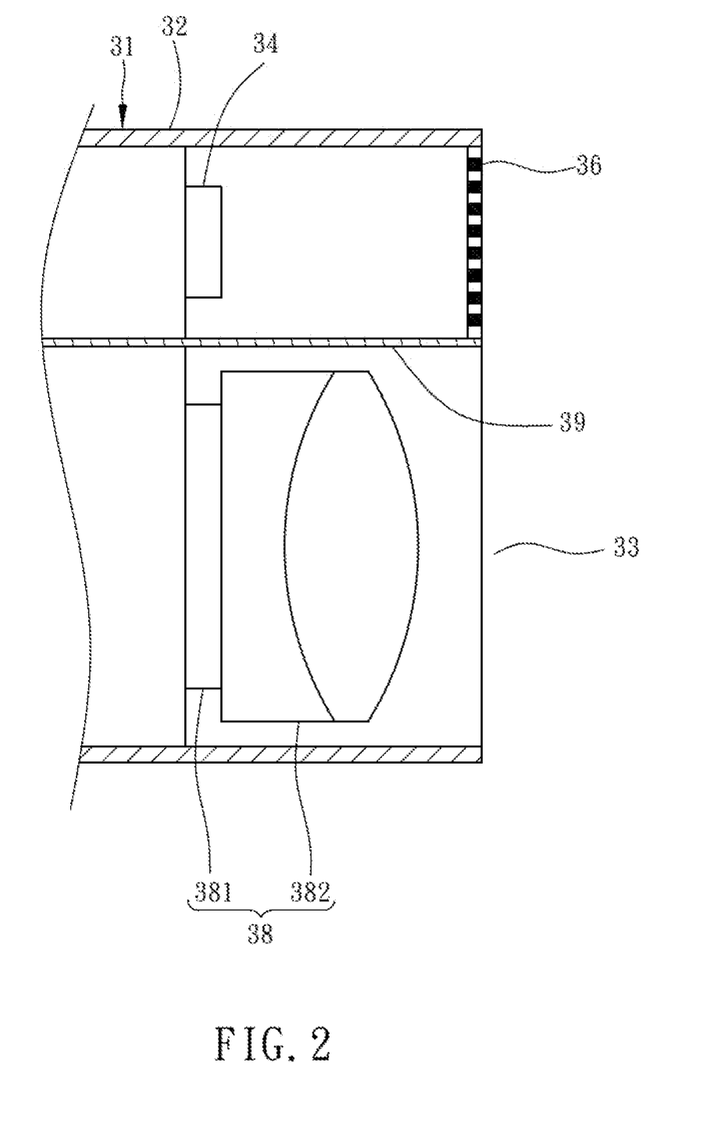
FIG. 2 is a sectional view of a part of the first embodiment of the present invention, illustrating the internal arrangement of the observation unit.

The main unit 11 is coupled with the observation unit 31 through the flexible tube 21. The observation unit 31 comprises a base tube 32, and a single wavelength light source 34, a diffraction grating 36, an image acquisition unit 38 and a shading baffle 39 respectively mounted within the base tube 32.

The base tube 32 defines an opening 33 in a front side thereof.

The single wavelength light source 34 is mounted in the base tube 32, and adapted for emitting a light of a predetermined wavelength $\lambda$ through the opening 33. In actual application, the single wavelength light source 34 can be a laser light, an infrared light source, an ultraviolet light source, or a visible light source for a specific wavelength. Further, the single wavelength light source 34 may be selected from a light emitting diode (LED); in this case, the LED can be directly mounted in the base tube 31. Alternatively, the single wavelength light source 34 can be a combination of a fiber optic and a light-emitting source; in this case, the light-emitting source is mounted in the main unit 11, and the fiber optic is mounted in the main unit 11 and inserted through the flexible tube 21 with the distal end thereof positioned in the base tube 31. Using a fiber optic to guide the light from a light-emitting source is of the known technique, so it will neither be explained in detail, nor expressed by drawings.

Figure 3:
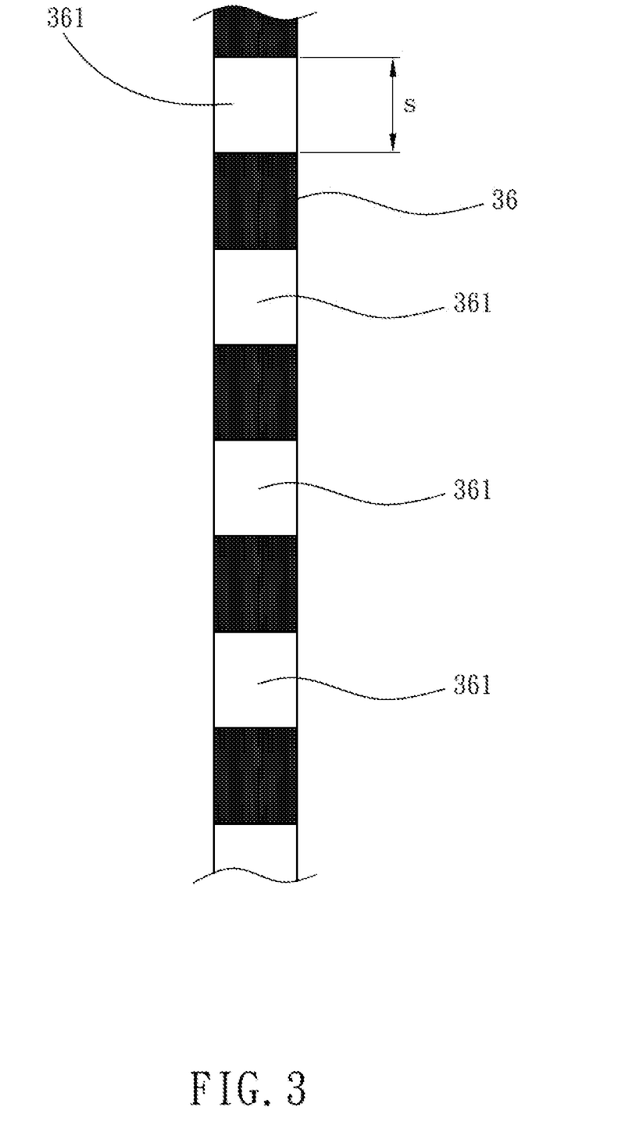
FIG. 3 is a schematic sectional view of a part of the diffraction grating of the endoscope in accordance with the first embodiment of the present invention.
Figure 5:
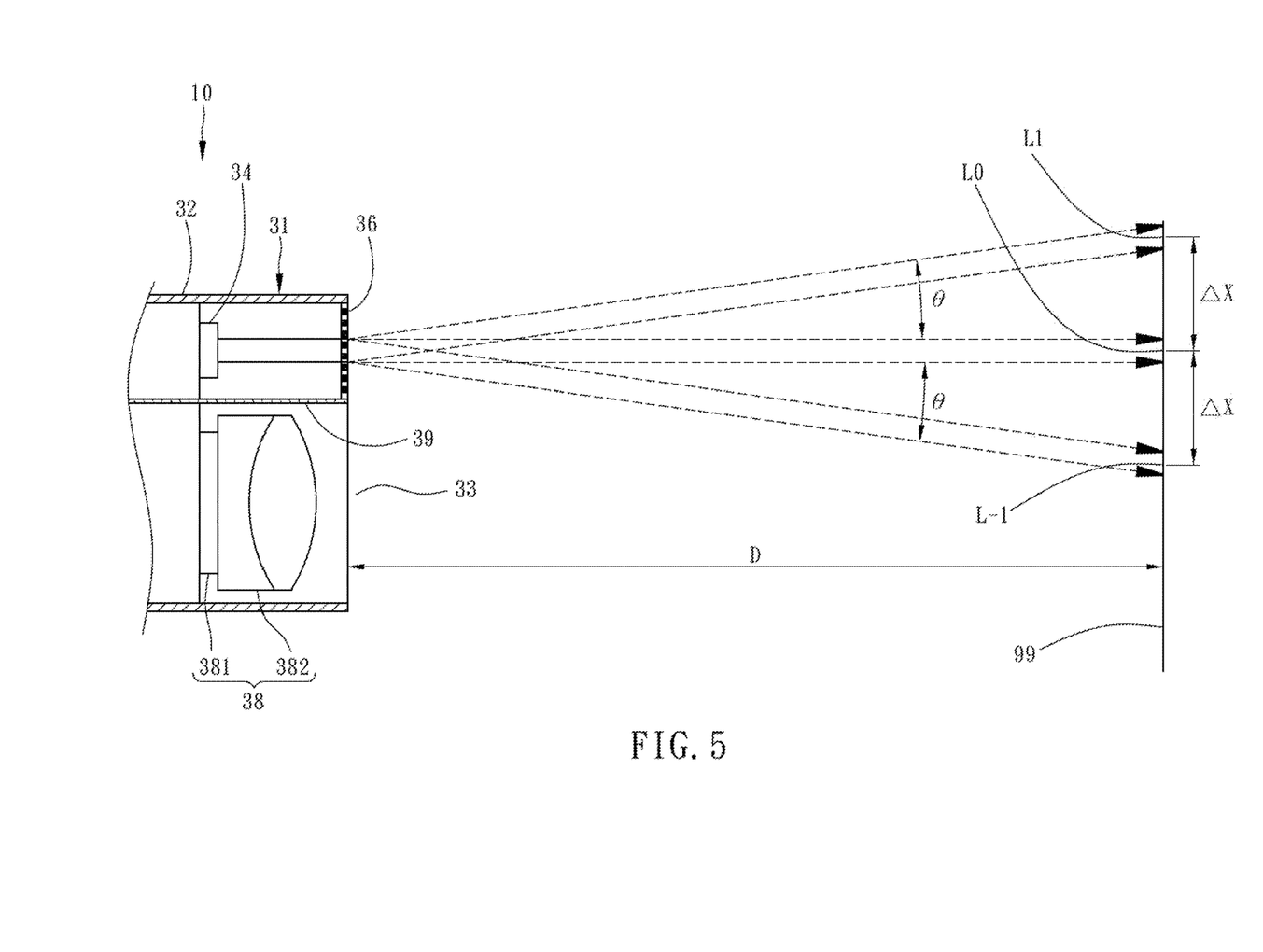
FIG. 5 is a schematic applied view of the endoscope in accordance with the first embodiment of the present invention.
Figure 6:
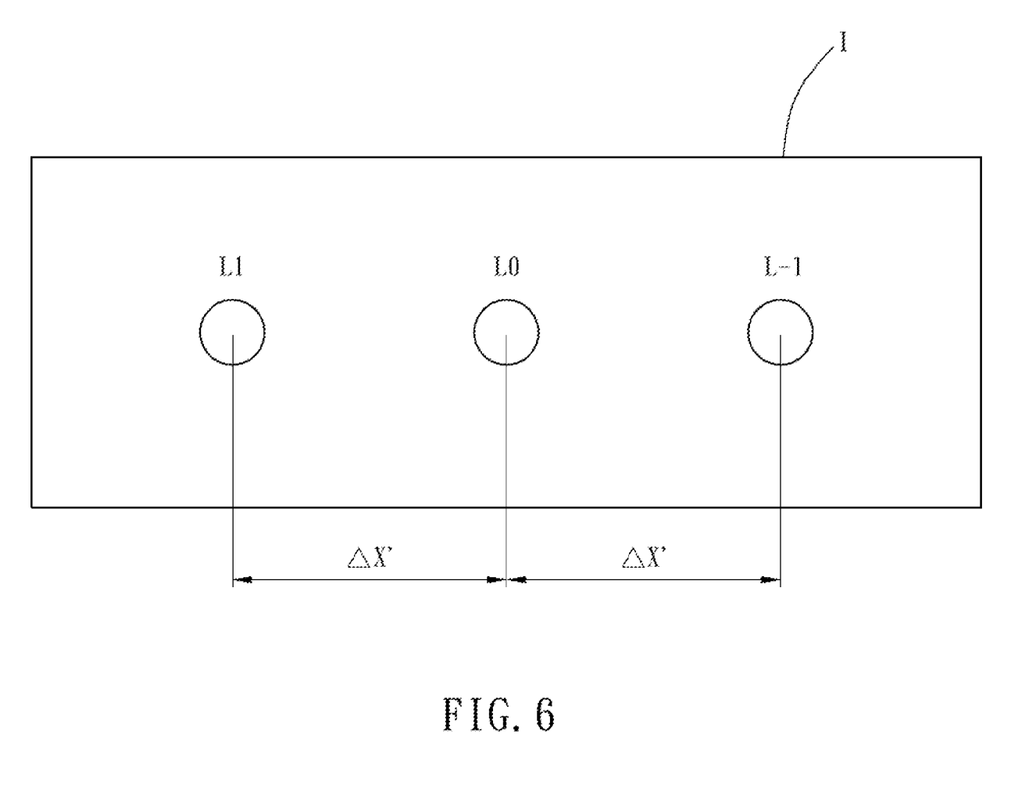
FIG. 6 is another schematic applied view of the endoscope in accordance with the first embodiment of the present invention.

The diffraction grating 36 defines therein a plurality of slots 361. Further, the diffraction grating 36 is mounted in the base tube 32 between the single wavelength light source 34 and the opening 33 for diffracting the single wavelength light that passes through the slots 361 and enabling the diffracted single wavelength light to be projected through the opening 33 onto the object 99 to show a zero order bright spot L0, positive first-order bright spot L1 at one lateral side relative to the zero-order bright spot L0, and a negative first-order bright spot L-1 at an opposite lateral side relative to the zero-order bright spot L0. The vector angle $\theta$ between the zero-order bright spot L0 and the adjacent positive or negative first-order bright spot L1, L-1 of the light emitted by the single wavelength light source 34 is obtained by calculating the predetermined wavelength $\lambda$ and the slot width s of the diffraction grating 36. The vector angle $\theta$ is obtained by the width s of the slots 361 and the wavelength $\lambda$ of the single wavelength light and calculated by the formula $s \sin \theta = \lambda$. Actually, the slots 361 are numerous and densely arranged, and it is difficult to express clearly on the schema; in the drawings, the slots 361 of the diffraction grating 36 are shown for the purpose of convenience only, but not illustrated according to actual proportion. The vector angle $\theta$ is obtained by the width s of the slit 361 and the wavelength $\lambda$ of the single wavelength light.

The image acquisition unit 38 is mounted in the base tube 32, comprising an image sensor 381 and a lens set 382. The lens set 382 comprises a lens magnification m. The image acquisition unit 38 takes an image I from a front side via the opening 33. Further, the effective imaging range of the image acquisition unit 38 covers the zero-order bright spot L0, the positive first-order bright spot L1 and the negative first-order bright spot L-1.

The shading baffle 39 is mounted in the base tube 32 to isolate the image acquisition unit 38 from the single wavelength light source 34 and the diffraction grating 36, prohibiting the emitted single wavelength light of the single wavelength light source 34 from being reflected or refracted in the base tube 32 toward the image acquisition unit 38.

Figure 4:
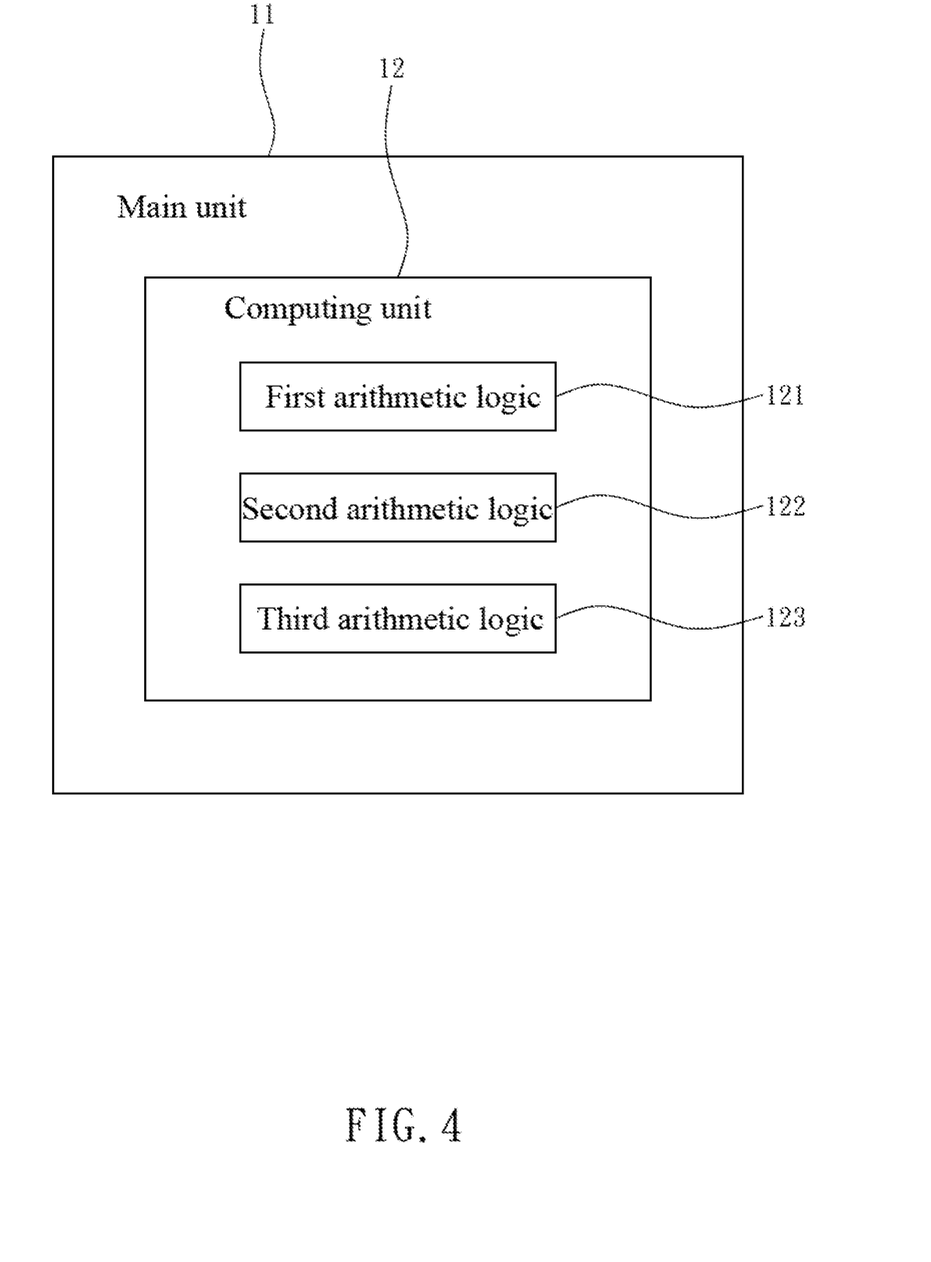
FIG. 4 is a circuit block diagram of the computing unit of the main unit of the endoscope in accordance with the first embodiment of the present invention.

The main unit 11 comprises a computing unit 12. The computing unit 12 has built therein a reference number of standard bright spot pixels P. Further, the computing unit 12 comprises three arithmetic logics, namely, the first arithmetic logic 121, the second arithmetic logic 122 and the third arithmetic logic 123. The first arithmetic logic 121 is adapted for obtaining a distance magnification M by calculating the lens magnification m and the pixel number $\Delta P(x)$ of any one bright spot on the image I and reference number of pixels of standard bright spot P; the second arithmetic logic 122 is adapted for calculating the distance $\Delta X'$ between two adjacent bright spots on the image I using the distance magnification M so as to obtain the actual distance ΔX between two adjacent bright spots projected on the object 99; the third arithmetic logic 123 is adapted for calculating the distance D between the diffraction grating 36 and the zero-order bright spot L0 by matching the vector angle θ with the actual distance ΔX between the two adjacent bright spots. Since the endoscope has a short distance generally not more than 20 cm when viewed from the object 99, the size of the bright spot projected by the single wavelength light onto the object 99 is hardly changed in any case of movement of the observation unit 31 of the endoscope within the viewing distance, so that the manufacturer can set a standard condition (e.g., a fixed distance), in which the number of pixels of the single-wavelength bright spot taken under the standard condition is defined as reference number of pixels of standard bright spot P.

In this first embodiment, the first arithmetic logic 121 defines the lens magnification as m, the distance magnification as M, the number of pixels of any one bright spot on the image I as ΔP(x) and reference number of pixels of standard bright spot as P, thus, the distance magnification M is obtained by calculating the following equation (1):

$$M = \frac{P}{m \times \Delta P(x)} \quad \text{equation (1)}$$

Thus, when the lens magnification m and reference number of pixels of standard bright spot P are fixed values, the change in the number of pixels ΔP(x) of any one bright spot on the image I will change the value of the distance magnification M.

In the second arithmetic logic 122, the distance between two adjacent bright spots on the image I is defined as ΔX' and the actual distance between two adjacent bright spots is defined as ΔX, thus, the actual distance between two adjacent bright spots ΔX is obtained by calculating the following equation (2):

$$\Delta X = \Delta X' \times M \quad \text{equation (2)}$$

Thus, by calculating the distance ΔX' between two adjacent bright spots on the image I and the distance magnification M, the actual distance ΔX between the two adjacent bright spots can be obtained.

Further, in the third arithmetic logic 123, the vector angle is defined as θ and the distance between the diffraction grating 36 and the zero-order bright spot L0 is defined as D; thus, the distance D between the diffraction grating 36 and the zero-order bright spot L0 is obtained by calculating the following equation (3):

$$D = \frac{\Delta X}{\tan \theta}. \quad \text{equation (3)}$$

In the case where the diffraction grating 36 is regarded as the observation unit 31, the distance D is regarded as the distance between the observation unit 31 and the object 99.

The above description explains the architecture of the first embodiment of the present invention. The distance measurement method used in the endoscope will be described hereinafter with reference to the architecture of the above-described first embodiment.

Referring to FIGS. 1-6, the distance measurement method of the present invention includes the steps as follows:

A) Cause the single wavelength light source 34 in the observation unit 31 at the front end of the flexible tube 21 of the endoscope to emit the light of the predetermined wavelength λ onto the object 99 via the diffraction grating 36 to form on the surface of the object 99 the zero-order bright spot L0 and the positive first-order bright spot L1 and negative first-order bright spot L-1 respectively at the two opposite lateral sides relative to the zero-order bright spot L0, wherein the vector angle θ between the zero-order bright spot L0 and the adjacent positive or negative first-order bright spot L1, L-1 of the light emitted by the single wavelength light source 34 is obtained by calculating the predetermined wavelength λ and the slot width s of the diffraction grating 36.

B) Cause the image acquisition unit 38 of the endoscope to take the image I of the object 99 that contains the zero-order bright spot L0, the positive first-order bright spot L1 and the negative first-order bright spot L-1.

C) Cause the computing unit 12 in the main unit 11 of the endoscope to calculate the number of pixels of the zero-order bright spot L0, the positive first-order bright spot L1 and the negative first-order bright spot L-1n on the image I, and then to refer the calculation results to the reference number of pixels of standard bright spot P preset in the computing unit 12, and then to calculate the distance magnification M according to the lens magnification m of the first arithmetic logic 121 and the image acquisition unit 38, and then to calculate the distance magnification M and the distance ΔX' between two adjacent bright spots on the image I using the second arithmetic logic 122 so as to obtain the actual distance ΔX between two adjacent bright spots on the object 99, and finally to calculate the actual distance ΔX between the two adjacent bright spots and the vector angle θ using the third arithmetic logic 123 so as to further obtain the distance D between the diffraction grating 36 and the zero-order bright spot L0, wherein, the expressions of the first, second and third arithmetic logics 121, 122, 123 can be referred to the aforesaid first embodiment.

Figure 7:
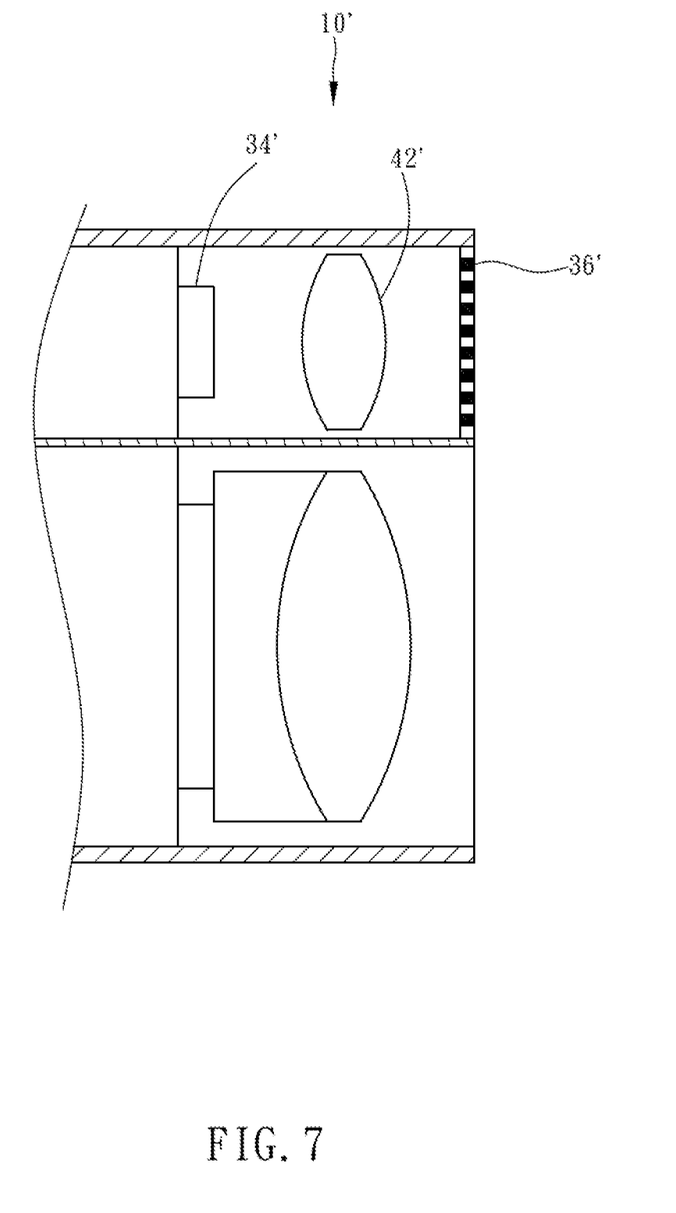
FIG. 7 is a schematic sectional view, illustrating the internal arrangement of an observation unit of an endoscope in accordance with a second embodiment of the present invention.
Figure 8:
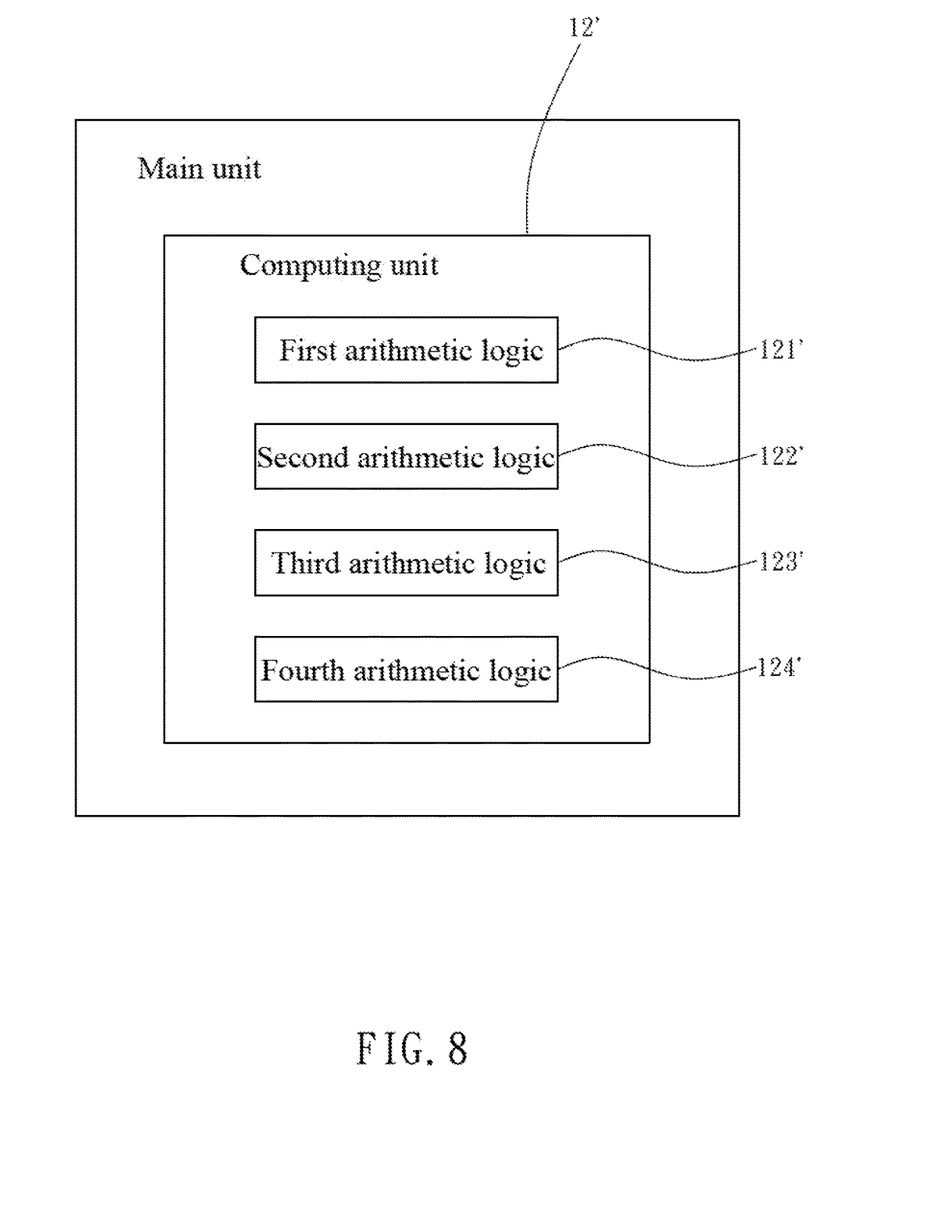
FIG. 8 is a circuit block diagram of the computing unit of the main unit of the endoscope in accordance with the second embodiment of the present invention.

It is known from the above that the distance measurement technique of the invention by means of optical interference can accurately measure the distance between the observation unit 31 of the endoscope and the object 99. The technical features of the invention are obviously different from those of the prior art Referring to FIGS. 7-9, an endoscope 10' in accordance with a second embodiment of the present invention is shown. This second embodiment is substantially similar to the aforesaid first embodiment with the exceptions as follows:

This second embodiment further comprises a collimator 42', and, the computing unit 12' further comprises a fourth arithmetic logic 124'.

The collimator 42' is mounted between the single wavelength light source 34' and the diffraction grating 36'. The single wavelength light emitted by the single wavelength light source 34' goes through the collimator 42' to the diffraction grating 36'. The collimator 42' is adapted for narrowing the light rays of the emitted single wavelength light into parallel light rays in a specific direction.

Figure 9:
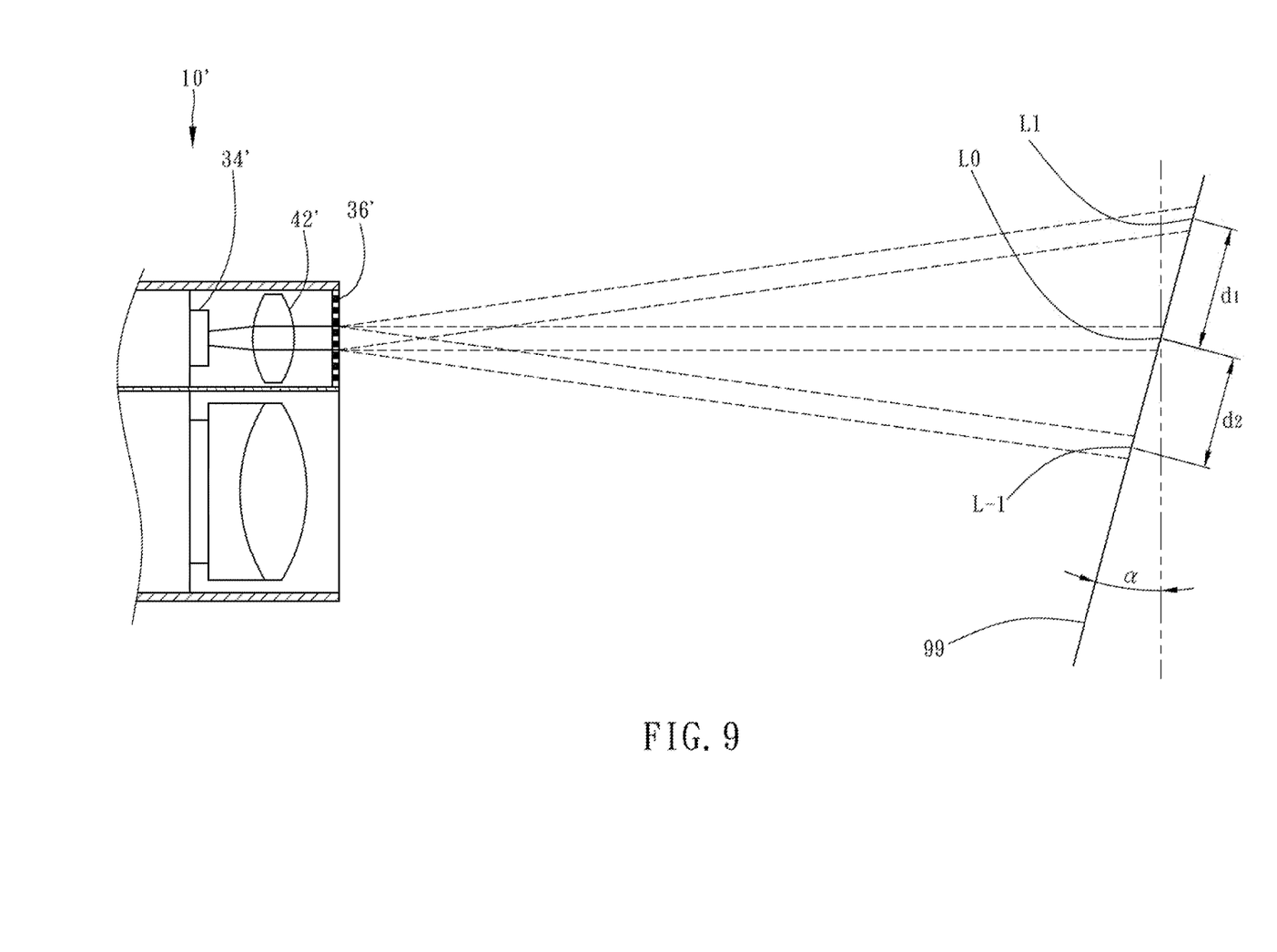
FIG. 9 is a schematic applied view of the endoscope in accordance with the second embodiment of the present invention.

The fourth arithmetic logic 124' is adapted for calculating the inclined angle α of the surface of the object 99 relative to the vertical surface with respect to the direction of the projection of the single wavelength light onto the zero-order bright spot L0 by using the difference between the distance d1 between the zero-order bright spot L0 and the positive first-order bright spot L1 and the distance d2 between the zero-order bright spot L0 and negative first-order bright spot L-1.

In the fourth arithmetic logic 124', the distance between the zero-order bright spot L0 and the positive first-order bright spot L1 is defined as d1, the distance between the zero-order bright spot L0 and the negative first-order bright spot L-1 is defined as d2 and the inclined angle of the surface of the object 99 relative to the vertical surface with respect to the direction of the projection of the single wavelength light onto the zero-order bright spot L0 is defined as α; thus, the inclined angle α is obtained by calculating the following equation (4):

$$\frac{d1}{d2} = \frac{\cos(\theta - \alpha)}{\cos(\theta + \alpha)} \qquad \text{equation (4)}$$

Thus, the inclined angle α can be obtained. Based on the inclined angle α, the user can judge whether or not the surface of the object 99 is perpendicular to the viewing direction.

When the first, second and third arithmetic logics 121', 122', 123' are executed, since the surface of the object 99 is inclined, it needs only to average the distance on the image between the zero-order bright spot L0 and the positive first-order bright spot L1 and the distance between the zero-order bright spot L0 and the negative first-order bright spot L-1 as the distance between two adjacent bright spots for calculation to obtain the distance D between the diffraction grating 36' and the zero-order bright spot L0.

The other structural details of this second embodiment and the object this second embodiment can achieve are same as the above-described first embodiment, and thus, they will not be repeated herein.

What is claimed is:

1. An endoscope, comprising:
a main unit, an observation unit and a flexible tube coupled between said main unit and said observation unit, said observation unit comprises a base tube, a single wavelength light source, a diffraction grating, an image acquisition unit and a shading baffle, said single wavelength light source, said diffraction grating, said image acquisition unit and said shading baffle being respectively mounted within said base tube, wherein:
said base tube defining an opening in a front side thereof;
said single wavelength light source being mounted in said base tube and adapted for emitting a single wavelength light of a predetermined wavelength forwardly through said opening;
said diffraction grating comprising a plurality of slots, said diffraction grating being mounted in said base tube between said single wavelength light source and said opening and adapted for diffracting the said single wavelength light and causing the diffracted said single wavelength light to be projected through the said opening onto an object to show a zero-order bright spot, a positive first-order bright spot at one lateral side relative to said zero-order bright spot and a negative first-order bright spot at an opposite lateral side relative to said zero-order bright spot, the vector angle between said zero-order bright spot and each of the said positive first-order bright spot and said negative first-order bright spot of said single wavelength light emitted by said single wavelength light source is obtained by calculating said predetermined wavelength and the slot width of said diffraction grating;
said image acquisition unit being mounted in said base tube, said image acquisition unit comprising an image sensor and a lens set, said lens set comprising a lens magnification, said image acquisition unit being adapted for taking an image of said object via said opening, the effective imaging range of said image acquisition unit covering said zero-order bright spot, said positive first-order bright spot and said negative first-order bright spot;
said shading baffle being mounted in said base tube to isolate said image acquisition unit from said single wavelength light source and said diffraction grating so as to prohibit the said single wavelength light emitted by said single wavelength light source from being reflected or refracted in said base tube onto said image acquisition unit;
said main unit comprises a computing unit, said computing unit having built therein a reference number of standard bright spot pixels, said computing unit comprising a first arithmetic logic, a second arithmetic logic and a third arithmetic logic, said first arithmetic logic being adapted for obtaining a distance magnification by calculating the lens magnification and the pixel number of any one bright spot on said image and said reference number of pixels of standard bright spot, said second arithmetic logic being adapted for calculating the distance between two adjacent bright spots on said image using said distance magnification so as to obtain the actual distance between two adjacent bright spots projected on said object, said third arithmetic logic being adapted for calculating the distance between said diffraction grating and said zero-order bright spot by matching said vector angle with the actual distance between the said two adjacent bright spots.

2. The endoscope as claimed in claim 1, further comprising a collimator mounted between said single wavelength light source and said diffraction grating and adapted for collimating the said single wavelength light emitted by said single wavelength light source through said diffraction grating.

3. The endoscope as claimed in claim 1, wherein in said first arithmetic logic, said lens magnification is defined as m, said distance magnification is defined as M, the number of pixels of any one bright spot on said image is defined as $\Delta P(x)$ and said reference number of standard bright spot pixels is defined as P, said distance magnification M is obtained by calculating the following equation (1):

$$M = \frac{P}{m \times \Delta P(x)} \qquad \text{equation (1)}$$

thus, when said lens magnification m and said reference number of pixels of standard bright spot P are fixed values, the change in the said number of pixels $\Delta P(x)$ of any one bright spot on said image I causes a change in the value of said distance magnification M.

4. The endoscope as claimed in claim 3, wherein in said second arithmetic logic, the distance between two adjacent bright spots on said image I is defined as $\Delta X'$ and the actual distance between two adjacent bright spots is defined as $\Delta X$, thus, the actual distance between two adjacent bright spots $\Delta X$ is obtained by calculating the following equation (2):

$$\Delta X = \Delta X' \times M \qquad \text{equation (2)}$$

thus, by calculating the distance ΔX' between two adjacent bright spots on said image I and the distance magnification M, the actual distance ΔX between the two adjacent bright spots is obtained.

5. The endoscope as claimed in claim 4, wherein in said third arithmetic logic, said vector angle is defined as θ and the distance between said diffraction grating and said zero-order bright spot is defined as D; thus, the distance D between said diffraction grating and said zero-order bright spot is obtained by calculating the following equation (3):

$$D = \frac{\Delta X}{\tan\theta}. \qquad \text{equation (3)}$$

6. The endoscope as claimed in claim 1, wherein said computing unit further comprises a fourth arithmetic logic adapted for calculating the inclined angle of the surface of said object relative to the vertical surface with respect to the direction of the projection of the said single wavelength light onto said zero-order bright spot by using the difference between the distance between said zero-order bright spot and said positive first-order bright spot and the distance between said zero-order bright spot and said negative first-order bright spot.

7. The endoscope as claimed in claim 6, wherein in said fourth arithmetic logic, the distance between said zero-order bright spot and said positive first-order bright spot is defined as d1, the distance between said zero-order bright spot and said negative first-order bright spot is defined as d2 and the inclined angle of the surface of said object relative to the vertical surface with respect to the direction of the projection of the said single wavelength light onto said zero-order bright spot is defined as α, thus, said inclined angle α is obtained by calculating the following equation (4):

$$\frac{d1}{d2} = \frac{\cos(\theta - \alpha)}{\cos(\theta + \alpha)}. \qquad \text{equation (4)}$$

8. The endoscope as claimed in claim 1, wherein said single wavelength light source is selectively a light-emitting diode, or a combination of a fiber optic and a light-emitting source.

9. An endoscopic distance measurement method, comprising the steps of:
A) causing a single wavelength light source in an observation unit at a front end of a flexible tube of an endoscope to emit a single wavelength light of a predetermined wavelength onto an object via a diffraction grating to form on a surface of said object a zero-order bright spot, a positive first-order bright spot at one side relative to said zero-order bright spot and a negative first-order bright spot at an opposite side relative to said zero-order bright spot, wherein the vector angle between said zero-order bright spot and each of said adjacent positive first-order bright spot and said negative first-order bright spot of the said single wavelength light emitted by said single wavelength light source is obtained by calculating said predetermined wavelength and the slot width of slots in said diffraction grating;
B) causing an image acquisition unit of said endoscope to take the image of said object that contains said zero-order bright spot, said positive first-order bright spot and said negative first-order bright spot; and C) causing a computing unit in a main unit of said endoscope to calculate the number of pixels of said zero-order bright spot, said positive first-order bright spot and said negative first-order bright spot on said the image, and then to refer the calculation results to a reference number of pixels of standard bright spot preset in said computing unit, and then to calculate a distance magnification according to the lens magnification of a first arithmetic logic and said image acquisition unit, and then to calculate the distance magnification and the distance between two adjacent bright spots on said image using a second arithmetic logic so as to obtain the actual distance between two adjacent bright spots on said object, and finally to calculate the actual distance between the said two adjacent bright spots and the vector angle using a third arithmetic logic so as to further obtain the distance between said diffraction grating and said zero-order bright spot.

10. The endoscopic distance measurement method as claimed in claim 9, wherein said first arithmetic logic, said lens magnification is defined as m, said distance magnification is defined as M, the number of pixels of any one bright spot on said image is defined as ΔP(x) and said reference number of standard bright spot pixels is defined as P, said distance magnification M is obtained by calculating the following equation (1):

$$M = \frac{P}{m \times \Delta P(x)} \qquad \text{equation (1)}$$

thus, when said lens magnification m and said reference number of pixels of standard bright spot P are fixed values, the change in the said number of pixels ΔP(x) of any one bright spot on said image I causes a change in the value of said distance magnification M.

11. The endoscopic distance measurement method as claimed in claim 10, wherein in said second arithmetic logic, the distance between two adjacent bright spots on said image I is defined as ΔX' and the actual distance between two adjacent bright spots is defined as ΔX, thus, the actual distance between two adjacent bright spots ΔX is obtained by calculating the following equation (2):

$$\Delta X = \Delta X' \times M \qquad \text{equation (2)}$$

thus, by calculating the distance ΔX' between two adjacent bright spots on said image I and the distance magnification M, the actual distance ΔX between the two adjacent bright spots is obtained.

12. The endoscopic distance measurement method as claimed in claim 11, wherein in said third arithmetic logic, said vector angle is defined as θ and the distance between said diffraction grating and said zero-order bright spot is defined as D; thus, the distance D between said diffraction grating and said zero-order bright spot is obtained by calculating the following equation (3):

$$D = \frac{\Delta X}{\tan\theta}. \qquad \text{equation (3)}$$

13. The endoscopic distance measurement method as claimed in claim 9, wherein said computing unit further comprises a fourth arithmetic logic adapted for calculating the inclined angle of the surface of said object relative to the vertical surface with respect to the direction of the projection of the said single wavelength light onto said zero-order bright spot by using the difference between the distance between said zero-order bright spot and said positive first-order bright spot and the distance between said zero-order bright spot and said negative first-order bright spot.

14. The endoscopic distance measurement method as claimed in claim 13, wherein in said fourth arithmetic logic, the distance between said zero-order bright spot and said positive first-order bright spot is defined as d1, the distance between said zero-order bright spot and said negative first-order bright spot is defined as d2 and the inclined angle of the surface of said object relative to the vertical surface with respect to the direction of the projection of the said single wavelength light onto said zero-order bright spot is defined as α, thus, said inclined angle α is obtained by calculating the following equation (4):

$$\frac{d1}{d2} = \frac{\cos(\theta - \alpha)}{\cos(\theta + \alpha)}. \qquad \text{equation (4)}$$

15. The endoscopic distance measurement method as claimed in claim 9, wherein said single wavelength light source is selectively a light-emitting diode, or a combination of a fiber optic and a light-emitting source.

* * * * *